US011523199B2

(12) United States Patent
Watermann

(10) Patent No.: US 11,523,199 B2
(45) Date of Patent: Dec. 6, 2022

(54) WIRELESS AUDIO TRANSMISSION SYSTEM HAVING AT LEAST ONE MICROPHONE HAND-HELD TRANSMITTER AND/OR BODYPACK

(71) Applicant: Sennheiser electronic GmbH & Co. KG, Wedemark (DE)

(72) Inventor: Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 16/613,176

(22) PCT Filed: May 18, 2018

(86) PCT No.: PCT/EP2018/063180
§ 371 (c)(1),
(2) Date: Nov. 13, 2019

(87) PCT Pub. No.: WO2018/215360
PCT Pub. Date: Nov. 29, 2018

(65) Prior Publication Data
US 2021/0084397 A1 Mar. 18, 2021

(30) Foreign Application Priority Data
May 23, 2017 (DE) ..................... 10 2017 111 191.3

(51) Int. Cl.
*H04W 4/80* (2018.01)
*H04R 1/08* (2006.01)
*H04R 27/00* (2006.01)

(52) U.S. Cl.
CPC ............... *H04R 1/08* (2013.01); *H04R 27/00* (2013.01); *H04R 2227/003* (2013.01); *H04R 2420/07* (2013.01)

(58) Field of Classification Search
CPC .... H04R 1/08; H04R 27/00; H04R 2227/003; H04R 2420/07; H04R 3/00; H04W 4/80; H04M 2017/2531; H04M 17/305
See application file for complete search history.

(56) References Cited

U.S. PATENT DOCUMENTS 10,523,062 B2 * 12/2019 Bae ......................... H02J 7/025
2007/0053370 A1 * 3/2007 Aghvami ............... H04W 8/18
370/401
(Continued)

FOREIGN PATENT DOCUMENTS

DE 10 2009 052297 5/2011

OTHER PUBLICATIONS

Search Report for Application No. PCT/EP2018/063180 dated Jul. 17, 2018.

*Primary Examiner* — Andrew Wendell
(74) *Attorney, Agent, or Firm* — Haug Partners LLP

(57) ABSTRACT

A method of wireless audio transmission between a wireless transmitter and a wireless receiver in a program making special event PMSE system. An audio signal is transmitted from the at least one wireless transmitter to the wireless receiver by way of a first wireless transmission path. The at least one wireless transmitter is coupled to a smart device by way of a second wireless transmission path in order to exchange parameters and/or data. Exchange of parameters and/or data occurs between the smart device and the wireless receiving unit by way of a network, in particular the Internet.

9 Claims, 2 Drawing Sheets

(56) References Cited

U.S. PATENT DOCUMENTS

Figure 1:
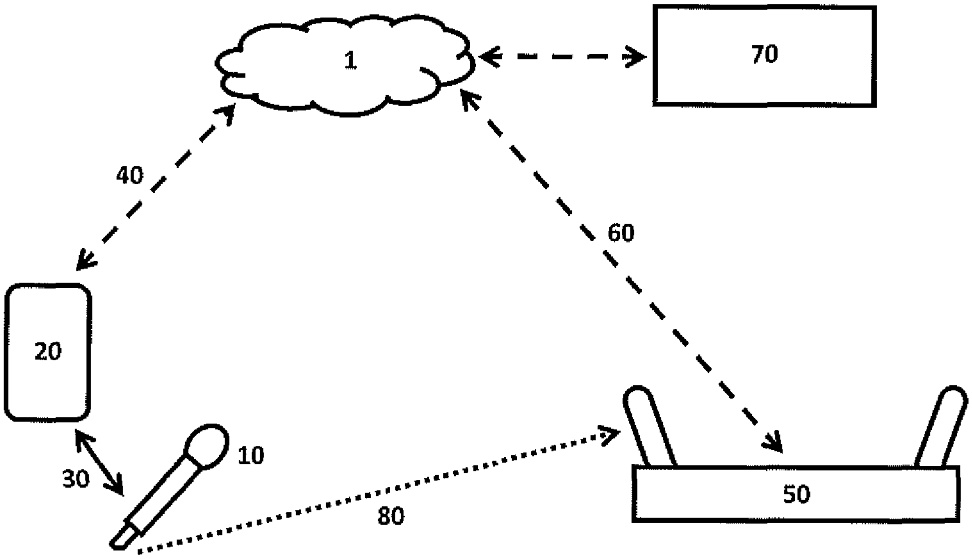

| | | | | |
|---|---|---|---|---|
| 2007/0255435 | A1* | 11/2007 | Cohen | H04R 25/505 700/94 |
| 2009/0029743 | A9* | 1/2009 | Lair | H04M 1/6066 455/569.1 |
| 2010/0119099 | A1* | 5/2010 | Haupt | G06F 3/165 381/369 |
| 2012/0183156 | A1* | 7/2012 | Schlessinger | G06F 3/165 381/111 |
| 2012/0310394 | A1* | 12/2012 | El-Hoiydi | H04B 7/0667 700/94 |
| 2014/0241559 | A1* | 8/2014 | Mulder | H04R 3/02 381/355 |
| 2014/0281076 | A1* | 9/2014 | Breece, III | G06F 13/4072 710/106 |
| 2014/0329468 | A1* | 11/2014 | Watson | H04R 3/12 455/41.3 |
| 2014/0370855 | A1 | 12/2014 | Koss et al. | |
| 2015/0180770 | A1* | 6/2015 | Wang | H04L 69/22 370/392 |
| 2015/0281841 | A1* | 10/2015 | Koike | H04H 20/44 381/3 |
| 2016/0353428 | A1* | 12/2016 | Kafle | H04L 65/1069 |
| 2017/0055089 | A1* | 2/2017 | Pedersen | G10L 19/167 |
| 2018/0131242 | A1* | 5/2018 | Louis | H04B 5/0031 |
| 2018/0193642 | A1* | 7/2018 | Chen | H04R 25/407 |
| 2018/0234777 | A1* | 8/2018 | Roeck | H04L 1/0014 |
| 2020/0252731 | A1* | 8/2020 | Davis | H04R 25/558 |

* cited by examiner

WIRELESS AUDIO TRANSMISSION SYSTEM HAVING AT LEAST ONE MICROPHONE HAND-HELD TRANSMITTER AND/OR BODYPACK

The present application is a national stage entry, under 35 U.S.C. 371, of International Application No. PCT/EP2018/063180 filed on May 18, 2018, which claims priority from German Application No. 10 2017 111 191.3 filed on May 23, 2017, the disclosures of which are incorporated by reference in their entireties.

FIELD OF THE INVENTION

The present invention concerns a wireless audio transmission system and a method of wireless audio transmission.

BACKGROUND

A wireless audio transmission system, in particularly a wireless microphone system, typically has at least one wireless microphone (handheld transmitter) and/or at least one bodypack. A bodypack has a wireless transmitter/receiver for wireless audio transmission and an audio input to which a wired microphone can be connected. The audio signals recorded by the microphone can then be transmitted wirelessly by way of the bodypack. Furthermore such a wireless microphone system has a wireless receiver which can receive audio signals transmitted from the wireless microphone or the bodypack. The wireless microphone and the bodypack typically have a plurality of operating parameters which can be adjusted to optimize audio transmission. Those parameters can be transmitted for example in a pilot channel of the audio transmission to the wireless receiving unit and are transmitted back to the microphone by way of a feedback channel.

As an alternative thereto adjustments of the parameters can be implemented by way of an infrared transmission or by way of a Bluetooth or ZigBee transmission. This therefore involves a further wireless transmission between the wireless receiver and the microphone or the bodypack. That however is disadvantageous because a further transmission path has to be provided in that case. In addition that also leads to an increased power consumption on the part of the wireless microphone or the bodypack. Furthermore high frequency blocking can occur if the audio transmission is effected wirelessly and transmission of the parameters is also effected wirelessly.

In the German patent application from which priority is claimed the German Patent and Trade Mark Office searched the following documents: US 2010/0 119 099 A1 and US 2014/0 370 855 A1.

SUMMARY OF THE INVENTION

An object of the present invention is to provide a wireless transmission system and a method of wireless audio transmission, in which parameters of the microphone or the bodypack can be effectively adjusted. In particular an object of the present invention is to provide an audio transmission system and a method of transmitting audio signals which permits adjustability of the parameters of the microphone and/or the bodypack and which in that respect operates in a power-saving manner.

That object is attained by a method of wireless audio transmission as set forth in claim 1 and a wireless audio transmission system as set forth in claim 4.

Thus there is provided a method of wireless audio transmission between a wireless transmitter and a wireless receiver in a program making special event PMSE system. An audio signal is transmitted from the at least one wireless transmitter to the wireless receiver by way of a first wireless transmission path. The at least one wireless transmitter is coupled to a smart device by way of a second wireless transmission path in order to exchange parameters and/or data. In addition exchange of parameters and/or data occurs between the smart device and the wireless receiving unit by way of a network, in particular the Internet. The first wireless transmission path has a latency of <5 ms and permits a direct transmission between the at least one transmitter and the receiver.

Accordingly there is provided a method of wireless audio transmission, wherein the audio data of a wireless transmitter, for example a wireless handheld microphone or a bodypack, are transmitted directly to a wireless receiver with a low latency of <5 ms. A feedback channel is then formed indirectly by way of the second data transmission path to the smart device and then from the smart device to the wireless receiver for example by way of the Internet. The communication between the smart device and the wireless receiver can in that case be effected Over The Top OTT, that is to say the resources of the smart device for a wireless communication can be used in that respect. Accordingly the feedback channel is different from the first transmission path which is effected directly from the wireless transmitter to the wireless receiver. The use of a smart device and coupling of the wireless transmitter to the smart device can make it possible to afford an effective and inexpensive option of a feedback channel between the wireless receiver and the wireless transmitter. Data and parameters can be exchanged by way of that feedback channel. This involves in particular data and parameters for the wireless transmitter and for the first wireless transmission path.

According to a further aspect of the present invention there is provided a wireless transmission system, in particular a program making special event PMSE system. The audio transmission system has at least one wireless transmitter for the wireless transmission of an audio signal by way of a first transmission path. In addition there is a wireless receiver which receives an audio signal transmitted by way of the first wireless transmission path, from the wireless transmitter. Moreover there is provided a smart device which is coupled to the wireless transmitter by way of a second wireless transmission path and can transmit parameters and/or data. The smart device and the wireless receiver are coupled together by way of a network in order to exchange parameters and/or data for the wireless transmitter and for the first wireless transmission path so that a feedback channel is implemented. The second transmission path can be of a bidirectional configuration.

According to an aspect of the present invention the second wireless transmission path is independent of the first wireless transmission path.

According to a further aspect of the present invention the at least one wireless transmitter does not have a display and the smart device is adapted for adjusting the parameters of the wireless transmitter. In that case adjustment of the parameters is effected by way of the second wireless transmission path.

According to a further aspect of the invention the wireless transmitter can be connected directly to the wireless receiver by way of a third wireless transmission path.

Further configurations of the invention are subject-matter of the appendant claims.

BRIEF DESCRITPION OF THE DRAWINGS

Advantages and embodiments by way of example of the invention are described in greater detail hereinafter with reference to the drawing.

Figure 2:
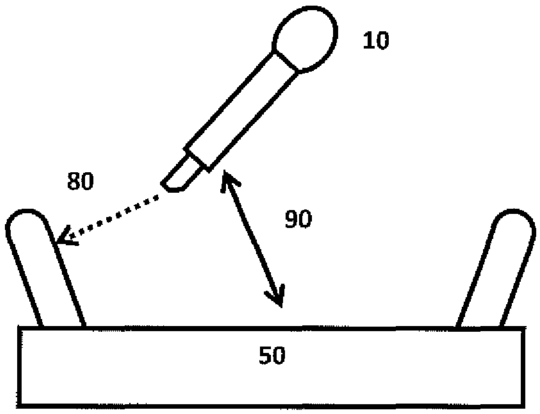
Figure 3:
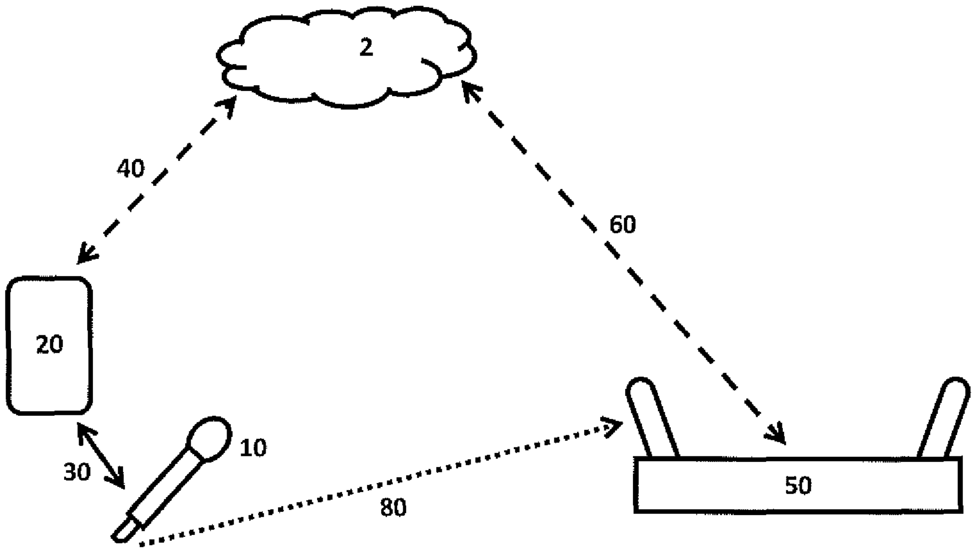

FIG. 1 shows a diagrammatic view of an audio transmission system according to a first embodiment, FIG. 2 shows a diagrammatic view of an audio transmission system according to a second embodiment, and FIG. 3 shows a diagrammatic view of a wireless audio transmission system according to a third embodiment.

DETAILED DESCRIPTION OF THE INVENTION

According to the invention there is provided a wireless audio transmission system which represents in particular a program making special event PMSE system. The PMSE system typically has at least one wireless transmitter in the form for example of a wireless handheld microphone and/or a wireless bodypack. There is also a wireless receiver.

FIG. 1 shows a diagrammatic view of an audio transmission system according to a first embodiment. The wireless audio transmission system has at least one wireless transmitter 10, a wireless receiver 50 and optionally a server 70. In addition there is at least one smart device 20 in the transmission system. There is a first wireless audio transmission path 80 between the wireless transmitter 10 and the wireless receiver 50. That first wireless transmission path 80 can be of a digital or analog configuration. The at least one wireless transmitter 10 is coupled to the smart device 20 by way of a second wireless transmission path 30. The smart device 20 can be coupled to the Internet 1 by way of a third wireless transmission path 40. The wireless receiving unit 50 can also be connected to the Internet by way of a fourth wireless transmission path 60. The server 70 can also be coupled to the Internet 1.

The first wireless transmission path 80 has a particularly low transmission latency of <5 ms which can be achieved with an analog frequency modulation FM or a proprietary digital modulation. The first wireless transmission path 80 represents a direct wireless transmission. That is achieved for example without an intermediate buffer. This therefore provides a wireless transmission between a wireless transmitter, for example a microphone, and a wireless receiver. The second wireless transmission path 230 is a different wireless transmission path from the first wireless transmission path 80.

The wireless transmitter 10 which is in the form of a radio microphone, handheld radio microphone or bodypack can be coupled to the smart device 20 by way of the second wireless transmission path 30 (for example Bluetooth Low Energy, WLAN). Preferably the second wireless transmission path 30 is in the form of a short-range and low-power consumption transmission path. While the wireless transmitter 10 transmits the audio data to the wireless receiver 50 by way of the first wireless transmission path 80 a feedback channel is implemented for adjusting parameters of the wireless transmitter 10 by the second transmission path 30, the smart device 20, the third transmission path 40, the Internet 1 and the fourth transmission path 60. In other words the wireless receiving unit 50 can adjust the parameters of the wireless microphone 10 by way of the smart device 20, the smart device 20 and the wireless receiving unit 50 being coupled together by way of the Internet 1.

Optionally the smart device 20 can have an app, by means of which the wireless transmitter or the microphone 10 can be controlled. In such a case for example it is possible to dispense with a display directly at the wireless transmitter 10.

The settings implemented by the smart device 20 can be transmitted to the wireless transmitter 10 by way of the second wireless transmission path 30. Furthermore the app on the smart device can use an existing Internet connection 40 (Edge, 3G, LTE, WLAN etc.) in order to exchange control data Over The Top OTT with the wireless receiver 50. The fourth transmission path 60 can have a wireless transmission path or a wired transmission path (LAN). It is important in that respect that the wireless receiver 50 is connected to the Internet 1. The server 70 can be used to store the information which is exchanged by way of the feedback channel in order to be able to later evaluate the adjustments.

According to an aspect of the present invention the second transmission path 30 is of a bidirectional configuration. The proposed system is inexpensive as it is possible to use the infrastructure for the smart device 20.

FIG. 2 shows a diagrammatic view of an audio transmission system according to a second embodiment. According to the second embodiment there is a direct wireless transmission path 90 between the wireless transmitter 10 and the wireless receiver 50 in addition to the first wireless transmission path 80, by way of which the audio signals are transmitted. The wireless receiver 50 can have a further module in order to transmit and receive information transmitted by way of the wireless transmission path 90. In this case it is possible to implement a feedback channel without the Internet and without a smart device 20.

The second embodiment can be meaningful in particular when the Internet connection drops out or when there is no smart device 20. As an alternative to the Bluetooth connection the wireless transmission path 90 can also have an infrared transmission path. Therefore the transmitter 10 must be moved close to the wireless receiver 50 so that the corresponding data can be exchanged.

The wireless transmitter 10 (wireless microphone or bodypack) can be produced more cheaply according to the invention because for example it is possible to dispense with a display.

According to an aspect of the present invention the smart device 20 can add further data to the parameters of the wireless transmitter 10 in the communication with the wireless receiver 50 or the server 70. Such information can include for example position information.

FIG. 3 shows a diagrammatic view of a wireless audio transmission system according to a third embodiment. The audio transmission system according to the third embodiment substantially corresponds to the audio transmission system according to the first embodiment, but the communication between the smart device 20 and the wireless receiver 50 is made not by way of the Internet but by way of a local network 2. That local network can represent a WLAN network, a piconet, a femtocell or the like.

According to the invention the feedback channel between the wireless receiver 50 and the microphone does not have to be real time-capable.

According to an aspect of the present invention the first and second wireless transmission paths are independent of each other. The first wireless transmission path serves for direct communication between the wireless transmitter and the wireless receiver. The second wireless transmission path serves for indirect communication between a smart device which is coupled to the wireless transmitter by way of a second wireless transmission path, for the exchange of parameters with a wireless receiver. The first wireless transmission path permits a transmission with a low latency of <5 ms. The latency of the second wireless transmission path does not have any such restriction. The first wireless transmission path can be based for example on an analog frequency modulation or proprietary digital modulation. The second wireless transmission path does not have any such modulation restriction. The second wireless transmission path can permit for example Bluetooth transmission, WLAN transmission, LTE transmission or the like.

The invention claimed is:

1. A method of wireless audio transmission between at least one wireless transmitter, in form of a wireless handheld microphone or a wireless body pack, and a wireless receiver in a program making special event (PMSE) system, comprising:

transmitting an audio signal by way of a first unidirectional wireless transmission path from the at least one wireless transmitter to the wireless receiver;

coupling the at least one wireless transmitter to a smart device by way of a second bidirectional wireless transmission path to exchange parameters and/or data for the wireless transmitter or the first unidirectional wireless transmission path; and exchanging parameters and/or data for the wireless transmitter or the first unidirectional wireless transmission path between the smart device and the wireless receiver by way of a network;

wherein the first unidirectional wireless transmission path has a latency of <5 ms and permit a direct transmission between the at least one wireless transmitter (10) and the wireless receiver based on the exchanged parameters and/or data, and wherein the parameters of the at least one wireless transmitter are adjusted based on parameters and/or data exchanged between wireless receivers via the smart device and the at least one wireless transmitter.

2. A method as set forth in claim 1, wherein the first wireless transmission path is based on a first transmission method, and wherein the second wireless transmission path is based on a second transmission method and is independent of the first wireless transmission path.

3. A method as set forth in claim 1, the method further comprising:

adjusting the parameters of the at least one wireless transmitter by means of the smart device.

4. A method as set forth in claim 1, wherein the first transmission path is based on an analog frequency modulation or a proprietary digital modulation.

5. A wireless audio transmission system, comprising:

at least one wireless transmitter for wireless transmission of an audio signal by way of a first unidirectional wireless transmission path, the at least one wireless transmitter comprising a wireless handheld microphone or a wireless body pack;

a wireless receiver for receiving from the at least one wireless transmitter an audio signal transmitted by way of the first unidirectional wireless transmission path; and a smart device coupled to the at least one wireless transmitter by way of a second wireless transmission path, wherein the smart device and the wireless receiver are coupled together by way of a network to exchange parameters and/or data for the at least one wireless transmitter and/or the first unidirectional wireless transmission path, wherein the second wireless transmission path is of a bidirectional configuration, wherein the first wireless transmission path has a latency of <5 ms and permits a direct transmission between the at least one wireless transmitter and the wireless receiver based on the parameters and/or data exchanged via the second wireless transmission path, and wherein the parameters of the at least one wireless transmitter are adjusted based on parameters and/or data exchanged between wireless receivers via the smart device and the at least one wireless transmitter.

6. A wireless audio transmission system as set forth in claim 5, wherein the first wireless transmission path is based on a first transmission method, and wherein the second wireless transmission path is based on a second transmission method and is independent of the first wireless transmission path.

7. A wireless audio transmission system as set forth in claim 5, wherein the at least one wireless transmitter is without a display, and wherein the smart device is adapted to adjust the parameters of the at least one wireless transmitter.

8. A wireless audio transmission system as set forth in claim 5, wherein the at least one wireless transmitter is connected directly to the wireless receiver by way of a further additional wireless transmission path.

9. A wireless audio transmission system as set forth in claim 5, wherein the first transmission path is based on an analog frequency modulation or a proprietary digital modulation.

* * * * *